Aug. 21, 1956  G. A. LYON  2,759,572
BRAKE DRUM COOLING DEVICE
Filed March 27, 1953
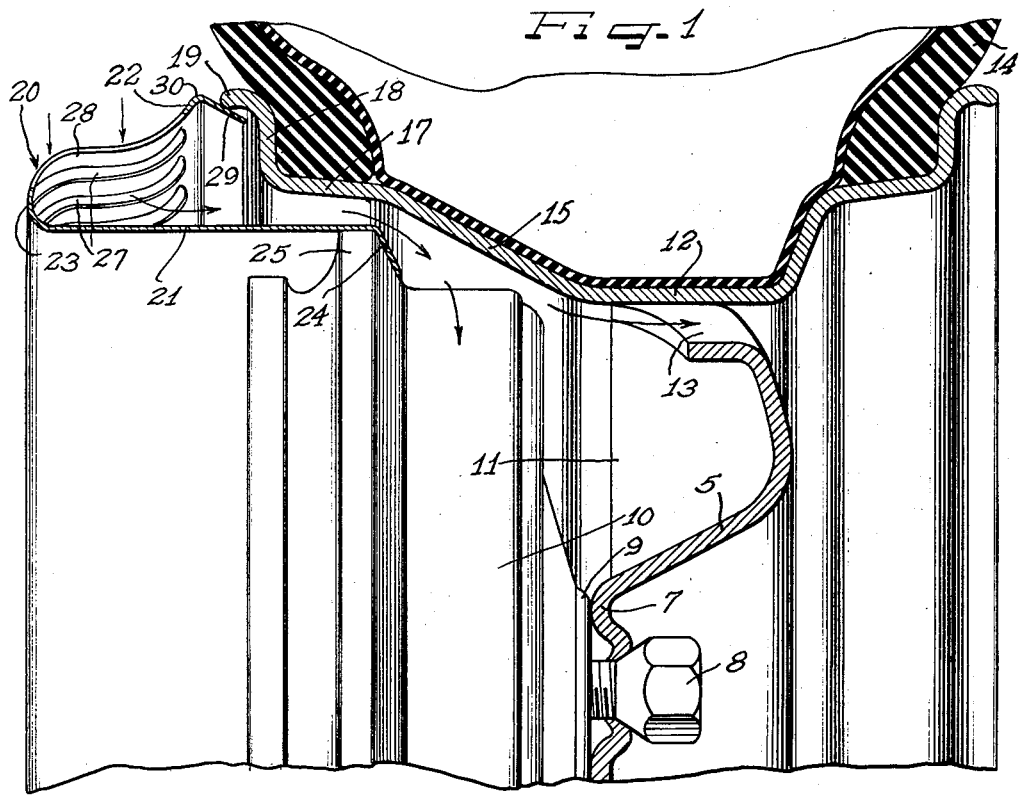
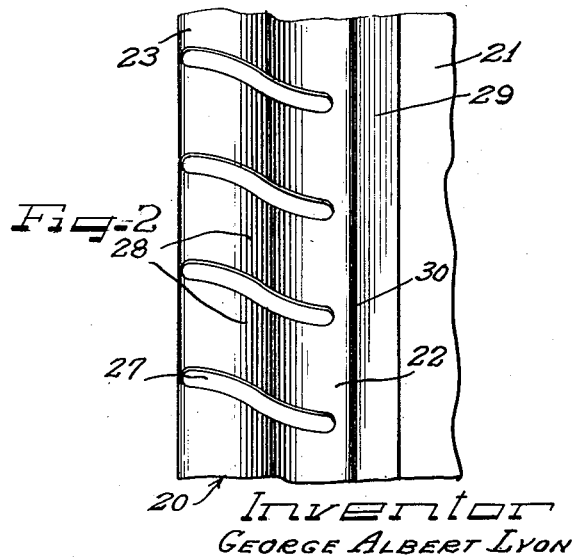
Inventor
GEORGE ALBERT LYON
by
Atty's.

United States Patent Office 2,759,572
Patented Aug. 21, 1956

2,759,572

BRAKE DRUM COOLING DEVICE

George Albert Lyon, Detroit, Mich.

Application March 27, 1953, Serial No. 345,196

14 Claims. (Cl. 188—264)

The present invention relates to improvements in the cooling of brake drums of vehicle wheel assemblies, and more particularly concerns the provision of a member that may be applied to the inner side of a wheel assembly for promoting the circulation of air in cooling relation over a brake drum to dissipate heat therefrom occasioned by operation of the brake in the running of the associated vehicle.

During operation of a vehicle brake assembly, substantial frictional energy is created between the brake shoes or disks and the brake drum, resulting in considerable heating of the brakes and the brake drum. Under modern conditions of high power and speed together with the considerable weight of modern automobiles burning out of the brakes is an ever present possibility under even normal operating conditions, especially where the encompassing tire rim and tire assembly tend to cause stagnation of the air about the brake drum.

An important object of the present invention resides in the provision of an efficient, inexpensive, easily applied ring shaped device for use at the inner side of a vehicle wheel assembly for promting effective circulation of air about the brake drum in the running of the vehicle.

Another object of the invention is to provide a novel brake drum cooling device in the form of a rolled sheet metal ring.

A further object of the invention is to provide a brake drum cooling device that is adapted to be made and sold at low cost.

Still another object of the invention is to produce a brake drum air circulation promoting device which is adapted to be made by unusually simple and effective sheet metal working steps.

Other objects, features and advantages of the present invention will be readily apparent from the following detailed description of a preferred embodiment thereof taken in conjunction with the accompanying drawings in which:

Figure 1 is a fragmentary transverse sectional view through a vehicle wheel structure embodying features of the present invention; and Figure 2 is a fragmentary outer side elevational view of the air circulation promoting ring member in Figure 1.

As an example of a wheel with which the present invention is especially useful, a disk spider, drop center wheel construction is shown in Figure 1.

The wheel comprises a disk spider wheel body 5 which may comprise a stamping from suitable heavy gauge sheet metal. A central dished bolt-on flange 7 on the wheel body is adapted to be secured as by means of cap screws or stud and nut attachment means 8 to a flange 9 comprising part of a vehicle axle hub assembly. Carried by the flange 9 is a brake housing or drum 10 within which is operable the brake mechanism of the associated vehicle insofar as the wheel under consideration is concerned. Such brake mechanism may comprise the well known brake shoe structure engageable with the generally axially extending, radially encompassing wall of the generally cup shaped brake drum 10, or the friction structure of the brake mechanism may comprise the disk type of structure also sometimes used, especially on some of the heavier automobiles requiring larger braking friction surfaces.

At its outer margin, the wheel body 5 is provided with a generally axially extending attachment flange 11 which is attached as by welding or riveting to a base flange 12 of a drop center, multi-flange tire rim. At suitable intervals such as 4, the attachment flange 11 is inset to provide ventilation for air circulation openings 13 between the wheel body and tire rim.

Inner and outer side flanges on the tire rim are constructed to support operatively a pneumatic tire and tube assembly 14. By virtue of the substantial width of the popular low pressure, balloon or cushion tires in popular demand, especially for use on automobiles, the width of the tire rim must be substantial for properly accommodating the tires. Since outward extension of the tire rim to accommodate the wide tires is impractical due to the limitations of fender clearance at the outer side of the wheel structure, the expedient of increasing the width of the tire rim toward the inner side has been extensively employed and is accomplished by providing an inner side flange 15 of substantial width sloping obliquely generally axially inwardly and radially outwardly. At its inner margin the side flange 15 joins an intermediate flange 17 which merges with a terminal flange 18 having the customary generally radially outwardly extending portion and a generally axially inwardly directed turned terminal extremity annular portion 19.

As will be observed, the substantial axially inward projection of the tire rim entirely radially encompasses the brake drum 10 when the wheel is assembled on the associated vehicle axle, and especially encompassed, fairly deeply within the wheel is the braking surface area of the brake drum most subject to heating as a result of frictional braking action. Since not only the tire rim annularly encompasses the brake drum, but the tire further bulges axially beyond the terminal flange of the tire rim, the brake drum 10 is quite shielded from the slip stream air passing the wheel assembly during running of the wheel. As a result there is stagnation of the atmosphere surrounding the brake drum within the wheel, and at high speeds a tendency toward development of low pressure by reason of the eductive effect of the rapidly passing slip stream at each side of the wheel assembly.

It is therefore highly desirable to provide means for effecting positive, ventilating, brake drum cooling of air through the wheel and more especially in cooling relation to the brake drum 10. To this end there is provided by the present invention a brake drum cooling device 20 which is in the form of a ring shaped member arranged to be mounted at the inner side of the wheel in association with the brake drum 10 and the inner side of the tire rim for positively effecting movement of air through the wheel in cooling relation to the brake drum when the wheel turns in service.

Herein the brake drum cooling ring 20 comprises a sheet metal structure made from thin gauge stainless steel sheet, brass sheet or strip or other suitable material and adapted to be formed up from the sheet metal strip by convenient, economical mass production method of manufacture as by rolling, for example. Accordingly, the ring shaped member 20 comprises a radially inner generally axially extending wall 21, a radially outer, also generally axially extending wall 22 of larger diameter and connected to the inner wall 21 by means of a generally radially extending, axially inner wall 23. The walls of the ring member are so constructed and arranged that they provide a generally U-shaped cross-section, hollow ring which is open toward the axially outer side thereof, as the device is applied to the wheel in service.

For attachment of the cooling ring 20 to the brake drum, the inner axially extending flange or wall 21 of the device has at its free, axially outer margin a generally radially inwardly turned and generally axially inwardly facing attachment or engagement flange 24 engageable with the axially outwardly facing shoulder provided by an annular radially outwardly projecting rib 25 on the axially inner portion of the brake drum 10. The internal diameter of the generally tubular, axially extending inner wall 21 of the cooling device is preferably slightly greater than the outside diameter of the brake drum rib 25 so that axial assembly of the cooling ring onto the brake drum from the outer side thereof can be readily effected by concentrically disposing the cooling ring about the brake drum and pushing the same axially inwardly until the engagement flange 24 seats against the opposing shoulder of the rib 25.

The length of the inner wall 21 of the cooling ring is such as to project substantially axially inwardly beyond the inner margin of the brake drum 10 beyond the tip of the inner terminal flange 19 of the tire rim and preferably also beyond the innermost bulging of the inflated tire and tube assembly 14. Thereby, the axially inner connecting wall 23, and the radially outer axially extending wall 22 are disposed in position to intercept the slip stream at the inner side of the wheel, as indicated by directional arrows in Figure 1. Hence, air in substantial and effective volume will be diverted through a series of openings 27 in the outer wall 22 into the cooling ring 20, and as indicated by directional arrows in Figure 1 axially outwardly through the open side of the cooling ring toward and into cooling circulation about and past the brake drum 10.

For promoting positive movement of air into and through the cooling ring 20, means are provided in the outer wall 22 at and in association with the openings 27 for deflecting air into the ring and for compelling movement of the air from the interior of the ring out of the open side of the ring. Herein such means comprise respective vanes 28 formed from the material of the wall 22 between the openings 27. The vanes 28 are obliquely permanently deflected and tilted relative to the periphery of the ring member, with outer lips directed in the direction of rotation of the ring in service and the inner lips of the tilted vanes directed in the trailing direction and toward the interior of the ring member 20. Thereby in the rotation of the ring 20 in service, the vanes 28 impel the air positively through the ring toward the brake drum 10 at an accelerated speed proportionate to the speed of rotation of the wheel with which associated. At high speeds, therefore, the highest acceleration of the cooling air is effected as is desirable since the greatest heat will be generated by the brake mechanism when operated during high speed travel of the vehicle.

Improved results are attained in the operation of the air scooping and impelling vanes 28 by having the same extend from and comprising part of the radially outer portion of the inner axial connecting wall 23 and throughout most of the length of the radially outer wall 22, and with the vanes being of generally sinuous form, on preferably an ogee longitudinal curvature, substantially as shown in Fig. 1. Through this arrangement, the vanes extend at their axially innermost ends generally radially outwardly and then turned generally axially outwardly toward their axially outermost end portions which turn generally radially outwardly. This arrangement of the vanes 28 is also effective at the rear portion of the wheel to enable an escape of some of the heated air within the chamber defined by the wheel about the brake drum and which due to the limited cross-sectional area provided by the wheel openings 13 may not be able to escape through such wheel openings, or due to the forward inertia of the moving vehicle may tend to pile up in the rear portion of the space about the brake drum.

A cooperative, retaining relation of the outer wall 22 of the cooling ring with the tire rim is attained by the provision of a shouldering flange 29 on the free margin of the wall 22 and engageable with the edge of the terminal flange lip 19. The flange 29 extends generally radially inwardly and axially outwardly obliquely so that in addition to shouldering against the terminal flange lip 19, it also has a camming action tending to cam slidably generally radially inwardly and thus place the wall 22 under radially inward deflection. This is desirable, for one thing, to tension the wall 22 and draw the retaining flange 24 of the inner wall portion of the ring tightly against the brake drum shoulder engaged thereby. The resiliency afforded by the vanes 28 enhances the axially inward thrusting and radially inward compression and tensioning of the cooling ring structure. A second benefit derived from this relationship to the brake drum 10 resides in the vibration damping afforded by the resilient ring structure so as to avoid the squealing of the brakes often arising from vibrations set up in the brake drum during operation of the brakes.

Juncture of the marginal flange 29 with the body portion of the wall 22 of the ring is preferably effected on a small radius rigidifying annular radially outwardly directed rib juncture 30. It will thus be apparent that the cooling ring 20 is substantially rigid at the axially inner and axially outer portions of the outer wall 22, while the vanes 28 which comprise the main portion of the body of the wall 22 have substantial resilience, especially enabling axial flexure of the wall member as an incident to assembly of the ring 20 with the wheel assembly. Therefore, the arrangement may be such that the marginal flange 29 is disposed axially outwardly closer to the corresponding axially outer margin of the radially inner wall 21 of the ring in the unassembled condition of the ring 20. Then as the terminal flange lip 19 presses axially inwardly against the marginal flange 29 when the wheel is attached to the hub flange 9 by the bolts 8, axially inward deflection and thereby compression and tensioning of the connecting vanes 28 occurs as the flange 29 is pushed axially inwardly relative to the wall 21 which is fixedly anchored by the engagement of its attachment flange 24 with the brake drum rib 25.

It will be observed that since the marginal shouldering flange 29 extends radially inwardly and axially outwardly at the interior or toward the interior of the ring member, such flange serves as a deflector for air entering the ring to thus direct the air with minimum turbulence toward the gap between the tire rim and the brake drum.

It is desirable to provide a pair of matching or complementary ring members 20 for each pair of wheels, with the louvers 28 of the ring members directed respectively to scoop air into and through the ring member in the forward rotation of the wheels.

It will be understood that modifications and variations may be effected without departing from the scope of the novel concepts of the present invention.

I claim as my invention:

1. In a wheel assembly including a wheel comprising a tire rim and a wheel body having means for attaching the same to a brake drum substantially encompassed in spaced concentric relation by the tire rim, the tire rim having a terminal flange lip and the brake drum having a generally axially outwardly facing shoulder directed toward the adjacent portion of the tire rim, an air cooling structure mounted at the inner side of the wheel and including means for directing air generally axially outwardly into the space between the tire rim and the brake drum for circulation in cooling relation to the brake drum, said air cooling structure having a portion thereof in engaged relation with said brake drum shoulder and another portion thereof in thrusting relation to said tire rim terminal flange lip, whereby to retain the air cooling structure in place.

2. In a wheel assembly comprising a brake drum and a tire rim substantially encompassing the brake drum in concentric spaced relation, the brake drum having an annular generally axially outwardly directed shoulder on its axially inner portion, the tire rim having an inner terminal flange lip directed generally axially inwardly, an air cooling ring structure at the inner side of the wheel in substantially closing relation to the inner opening between the brake drum and the tire rim, said ring having shoulder means thereon retainingly engageable with said brake drum shoulder and other shoulder means thereon retainingly engageable with said terminal flange lip.

3. In a wheel assembly comprising a brake drum and tire rim substantially encompassing the brake drum in concentric spaced relation, the brake drum having an annular generally axially outwardly directed shoulder on its axially inner portion, the tire rim having an inner terminal flange lip directed generally axially inwardly, an air cooling ring structure at the inner side of the wheel in substantially closing relation to the inner opening between the brake drum and the tire rim, said ring having shoulder means thereon retainingly engageable with said brake drum shoulder and other shoulder means thereon retainingly engageable with said terminal flange lip, said lip engageable shoulder comprising a flange angled generally radially inwardly and axially outwardly.

4. In a wheel assembly including a brake drum and a generally encompassing tire rim, an air cooling annulus having radially inner and radially outer walls and an axially inner connecting wall, said radially inner and radially outer walls having generally radially inwardly and axially outwardly respective angled flanges, the angled flange of the radially inner wall being retainingly engageable with the brake drum and the angled flange of the radially outer wall being retainingly engageable with the tire rim.

5. In a wheel assembly including a brake drum and a generally encompassing tire rim, an air cooling annulus having radially inner and radially outer walls and an axially inner connecting wall, said radially inner and radially outer walls having generally radially inwardly and axially outwardly respective angled flanges, the angled flange of the radially inner wall being retainingly engageable with the brake drum and the angled flange of the radially outer wall being retainingly engageable with the tire rim, said radially outer wall having air deflecting louvres thereon for deflecting air into and through the ring in the rotation thereof with the wheel, said angled flange on the radially outer wall being in air deflecting relation to said louvres for deflecting the air toward said radially inner wall.

6. In a wheel structure comprising a brake drum and a wheel rim in radially spaced concentric relation thereto, an air circulation promoting ring member at the inner side of the wheel comprising a portion retainingly engageable with the brake drum and a portion having a cam flange cammingly thrustable against a generally axially inwardly projecting portion of the tire rim.

7. In a wheel assembly comprising a tire rim and a wheel body attached to a brake drum substantially encompassed in radially spaced relation by an axially inner portion of the tire rim, an annular air circulation promoting ring member for directing air from the slip stream at the inner side of the wheel into the gap between the tire rim and the brake drum for cooling the brake drum, said ring member having a radially inner portion in retaining engagement with the brake drum and a radially outer portion engaging the tire rim in radially inwardly compressed and axially inwardly tensioned engagement whereby to place the ring member under compression and tension for damping audible vibrations of the brake drum.

8. As an article of manufacture, a sheet metal hollow annulus adapted to be mounted at the inner side of a vehicle wheel at the annular opening between a tire rim and a brake drum of the wheel, said annulus having spaced radially inner and outer annular walls defining an annular opening from one axially directed side of the annulus while the opposite axially directed side of the annulus has a connecting wall, the radially outer annular wall and said connecting wall having a plurality of elongated openings extending transversely therethrough to the interior of the annulus, and air deflector means at said openings on both said radially outer and connecting walls for effecting movement of air through said openings and through the annulus upon rotation of the annulus.

9. As an article of manufacture, a sheet metal hollow annulus adapted to be mounted at the inner side of a vehicle wheel at the annular opening between a tire rim and a brake drum of the wheel, said annulus having spaced radially inner and outer annular walls defining an annular opening from one axially directed side of the annulus while the opposite axially directed side of the annulus has a connecting wall, the radially outer annular wall and said connecting wall having a plurality of elongated openings extending transversely therethrough to the interior of the annulus, and air deflector means at said openings on both said radially outer and connecting walls for effecting movement of air through said openings and through the annulus upon rotation of the annulus, said radially outer wall and at least the adjacent portion of said connecting wall being of generally sinuous transverse form.

10. As an article of manufacture, a brake drum cooling ring structure comprising a hollow annular body of generally channel shape cross-section and opening toward one axial side of the body, means on the radially outer periphery of the body for engagement with a tire rim, means on the radially inner periphery of the body for engagement with a brake drum, the radially outer periphery of the body comprising a wall of generally ogee transverse contour subdivided by a series of uniformly spaced transverse openings into a plurality of uniform louver sections, said louver sections being permanently deflected into tilted relation to the periphery of the annular body for deflection of air into the annular body in the rotation of the ring structure.

11. As an article of manufacture, a brake drum cooling ring structure comprising a hollow annular body of generally channel shape cross-section and opening toward one axial side of the body, means on the radially outer periphery of the body for engagement with a tire rim, means on the radially inner periphery of the body for engagement with a brake drum, the radially outer periphery of the body comprising a wall of generally ogee transverse contour subdivided by a series of uniformly spaced transverse openings into a plurality of uniform louver sections, said louver sections being permanently deflected into tilted relation to the periphery of the annular body for deflection of air into the annular body in the rotation of the ring structure, said body having annular substantially rigid portions at the respectively opposite ends of said openings.

12. A brake drum air cooling ring structure comprising annular radially spaced inner and outer walls and a connecting wall at one axial side of the ring with the opposite axial side open, the radially outer wall being of generally ogee cross-section and divided by series of transverse openings into a plurality of louver sections, the axially inner and axially outer portions of the annulus adjacent the openings being connected by the louver sections and said louver sections being disposed in tilted relation to the periphery of the ring.

13. In a brake drum air circulation promoting cooling ring structure, spaced radially inner and radially outer portions, said radially outer portion having a uniform series of transversely extending elongated openings therein with substantially rigid annular portions at the respectively axially inner and axially outer ends of the openings, the sections of the radially outer portion of the structure being in tilted louver shape and merging at their ends with said relatively rigid annular portions.

14. In a sheet metal annulus for disposition at the inner side of a wheel assembly in cooperative relation to the gap between a tire rim and a brake drum for moving slip stream air into said gap, said annulus comprising radially inner and radially outer walls with a juncture portion therebetween and defining an axially directed annular opening from the annulus, said radially inner and outer walls having respective generally radially inwardly and axially outwardly directed flanges for engagement with respectively a brake drum and a tire rim.

References Cited in the file of this patent

UNITED STATES PATENTS

| | | |
|---|---|---|
| 2,024,244 | Nelson | Dec. 17, 1935 |
| 2,131,186 | Jeune | Sept. 27, 1938 |
| 2,143,950 | Kliesrath | Jan. 17, 1939 |
| 2,265,938 | Eksergian | Dec. 9, 1941 |
| 2,489,522 | Chase | Nov. 29, 1949 |
| 2,599,707 | Gandelot | June 10, 1952 |
| 2,600,410 | Lyon | June 17, 1952 |

FOREIGN PATENTS

| | | |
|---|---|---|
| 787,597 | France | July 8, 1935 |